(12) United States Patent
Kuwahara et al.

(10) Patent No.: US 6,530,243 B1
(45) Date of Patent: Mar. 11, 2003

(54) METHOD OF MAKING AN OPTICAL FIBER WITH AN IMPROVED UV-CURABLE RESIN

(75) Inventors: Kazuya Kuwahara, Yokohama (JP); Ichiro Tsuchiya, Yokohama (JP); Yasuhiro Naganuma, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/659,831

(22) Filed: Sep. 11, 2000

(51) Int. Cl.$^7$ .............................................. C03B 37/027
(52) U.S. Cl. .............................. 65/377; 65/432; 65/434; 65/384; 65/382
(58) Field of Search .................... 65/432, 377, 434, 65/384, 382

(56) References Cited

U.S. PATENT DOCUMENTS

| | | | | |
|---|---|---|---|---|
| 4,113,350 A | * | 9/1978 | Haines | 385/128 |
| 4,349,587 A | * | 9/1982 | Aloisio et al. | 427/163.2 |
| 4,367,918 A | * | 1/1983 | Pinnow | 385/123 |
| 4,793,840 A | * | 12/1988 | Harding | 65/381 |
| 4,851,165 A | * | 7/1989 | Rennell | |
| 4,874,415 A | * | 10/1989 | Boniort et al. | 65/432 |
| 4,884,866 A | * | 12/1989 | Rusin | 297/360 |
| 4,894,078 A | * | 1/1990 | Takimoto et al. | 65/432 |
| 5,042,907 A | * | 8/1991 | Bell et al. | 385/123 |
| 5,219,623 A | * | 6/1993 | Petisce | 427/163.2 |
| 5,298,047 A | * | 3/1994 | Hart et al. | 65/432 |
| 5,647,884 A | * | 7/1997 | Overton et al. | 264/2.7 |

FOREIGN PATENT DOCUMENTS

| | | | | |
|---|---|---|---|---|
| JP | 54-13353 | * | 1/1979 | 65/432 |
| JP | 56-49865 | | 11/1981 | |
| JP | 59-97547 | * | 6/1984 | 65/432 |
| JP | 60-180939 | * | 9/1985 | 65/432 |
| JP | 62-241846 | | 10/1987 | |

OTHER PUBLICATIONS

"Calculation of Cooling Rate and Induced Stresses in Drawing of Optical Fibers," by Paek et al., Journal of American Ceramic Society, Vo. 58, No. 7–8, pp. 330–331.

* cited by examiner

Primary Examiner—John Hoffmann
(74) Attorney, Agent, or Firm—McDermott, Will & Emery

(57) ABSTRACT

A method of drawing an optical fiber which can improve the efficiency in manufacture without deforming resin coatings is provided. The method of drawing an optical fiber in accordance with the present invention is a method in which an optical fiber yielding an outside diameter of 300 to 600 μm after a resin coating is formed is drawn at a drawing speed of at least 50 m/min, wherein the optical fiber is drawn in a state where the pass line length $z_p$ from the outlet of curing furnace to the entrance part of capstan satisfies the following expression (1):

$$z_p \geq -\frac{\overline{\rho C_p} \cdot d_2}{4} \cdot \frac{d_2^2 - d_1^2}{A} \cdot V_f \cdot \ln\left[\frac{(T_g - 10) - T_o}{T_s - T_o}\right] \quad (1)$$

where $T_g$ is the glass transition temperature of the coating resin [° C.];

$T_s$ is the fiber temperature [=$T_F(0)$] at z=0 [° C.];

$T_O$ is the room temperature [° C.];

$\overline{\rho C_p}$ is the average heat capacity of glass and resin [J/(cm$^3$·° C.)];

$d_1$ is the radius before coating [cm];

$d_2$ is the radius after coating [cm];

A is a given constant within the range of $1.5 \times 10^{-6}$ to $4.5 \times 10^{-6}$ [J/(sec·° C.)]; and $V_f$ is the drawing speed [cm/sec].

2 Claims, 5 Drawing Sheets

Fig.4A

| | | | | | |
|---|---|---|---|---|---|
| CASE WHERE RESIN GLASS TRANSITION TEMPERATURE Tg=80°C IN SECONDARY COATING (PRIMARY COATING DIAMETER $2d_1$=290 μm / SECONDARY COATING DIAMETER $2d_2$=400 μm) | | | | | |
| PASS LINE LENGTH $z_p$ (cm) | DRAWING SPEED $V_f$ (m/min) | FIBER TEMPERATURE $T_s$(°C) AT z=0 | CAPSTAN ENTRANCE PART TEMPERATURE (°C) | EXPRESSION (1),(5) | DEFORMATION (COLLAPSE) OF RESIN COATING |
| 190 | 50 | 132 | 62 | TRUE | NO |
| 190 | 100 | 130 | 80 | FALSE | YES |
| 360 | 155 | 128 | 66 | TRUE | NO |
| 360 | 224 | 124 | 78 | FALSE | YES |
| 560 | 230 | 124 | 60 | TRUE | NO |
| 560 | 300 | 123 | 72 | FALSE | YES |
| 560 | 400 | 122 | 83 | TRUE | YES |
| 700 | 500 | 121 | 82 | FALSE | YES |

Fig.4B

| | | | | | |
|---|---|---|---|---|---|
| CASE WHERE RESIN GLASS TRANSITION TEMPERATURE Tg=105°C IN SECONDARY COATING (PRIMARY COATING DIAMETER $2d_1$=290 μm / SECONDARY COATING DIAMETER $2d_2$=400 μm) | | | | | |
| PASS LINE LENGTH $z_p$ (cm) | DRAWING SPEED $V_f$ (m/min) | FIBER TEMPERATURE $T_s$(°C) AT z=0 | CAPSTAN ENTRANCE PART TEMPERATURE (°C) | EXPRESSION (1),(5) | DEFORMATION (COLLAPSE) OF RESIN COATING |
| 190 | 100 | 130 | 80 | TRUE | NO |
| 190 | 230 | 124 | 97 | FALSE | YES |
| 360 | 300 | 123 | 88 | TRUE | NO |
| 360 | 500 | 121 | 97 | FALSE | YES |
| 560 | 500 | 121 | 90 | TRUE | NO |

METHOD OF MAKING AN OPTICAL FIBER WITH AN IMPROVED UV-CURABLE RESIN

BACKGROUND OF THE INVENTION

1. Field of the Invention

The present invention relates to a method of drawing an optical fiber by which an optical fiber is drawn.

2. Related Background Art

In general, an optical fiber is surrounded by a resin coating in order to protect the optical fiber and so forth. Known as an example of such a resin coating is one using a thermosetting resin, such as silicone, as described in Japanese Patent Publication No. SHO 56-49865. When a thermo-curable resin is used, the resin coating cures in a heat-curing furnace, whereby the optical fiber coming out of the heat-curing furnace attains a high temperature. In view of this, there has been an idea of cooling the optical fiber between the heat-curing furnace and a capstan for taking up the fiber. Also, there are optical fibers using a UV-curable resin as the resin coating. In this case, the temperature of the optical fiber coming out of the UV-curing furnace is not so high as in the case of the optical fiber using a thermo-curable resin. Hence, it has not been considered necessary to cool the optical fiber between the UV-curing furnace and the capstan when a UV-curable resin is used.

Japanese Patent Application Laid-Open No. SHO 62-241846 describes a case of tandem coating in which primary coating and secondary coating are carried out by use of UV-curable resins. This publication states the necessity to cool the optical fiber on the upstream side of a secondary die for forming the secondary coating since the application of secondary coating becomes unstable if the temperature of optical fiber rises before the secondary coating is formed. However, there is no consideration concerning the cooling between the secondary die and capstan.

In optical fibers with an outside diameter of 250 $\mu$m after being coated with a resin, which are employed in general, the heat capacity of their coated part is so small that temperature does not rise much due to the heat of reaction in the resin-coated part, whereby they can fully be cooled by air cooling. By contrast, optical fibers with a thicker resin coating, which have conventionally been in existence, are drawn slowly to draw and can fully be cooled by air cooling.

An optical fiber is pulled while the periphery thereof is coated with a resin upon drawing, and is finally taken up by a take-up bobbin. At this time, the optical fiber is pulled while being held from its sides by a capstan. If the optical fiber is held by the capstan before the applied resin does not cure fully, then the applied resin may collapse and deform, thereby deteriorating transmission characteristics.

SUMMARY OF THE INVENTION

In recent years, the demand for optical fibers having a thicker resin coating has been increasing from the viewpoint of transmission characteristics, such as those for dispersion-shifted optical fibers for large-capacity transmissions, whereby the efficiency in the making thereof has been desired to improve. When increasing the drawing speed in order to enhance the productivity, the problem of collapsing has become evident. This problem occurs due to the fact that, as the resin coating is thicker, it becomes difficult for the applied coating to cool, and the curing reaction heat of the resin coating increases, whereby the applied coating becomes less likely to cool. Detrimental effects such as increases in dimensions of apparatus become greater if the pass line length is elongated more than necessary in order to fully cool the resin coating, whereas the efficiency in manufacture will decrease if the drawing speed is lowered for curing of the coated resin.

For satisfying both the quality of a made optical fiber and improvement of efficiency in manufacture at the same time at a high level, the inventors have carried out diligent studies in order to define an optimal pass line length according to a drawing condition for the optical fiber, and have found that the optimal pass line length corresponding to the drawing condition can be defined. The present invention is attained on the basis of the above-mentioned finding, and it is an object of the present invention to provide a method of drawing an optical fiber by which the efficiency in manufacture can be improved without deforming the resin coating.

The object of the present invention is to provide a method of drawing an optical fiber, in which an optical fiber with an outside diameter of 300 to 600 $\mu$m after a resin coating is formed is drawn at a drawing speed of at least 50 m/min, the method comprising the step of drawing the optical fiber while forming the resin coating in a state where the pass line length $z_p$ from the most downstream outlet of a curing furnace for curing the resin coating to the most upstream entrance part of a capstan for pulling the optical fiber toward the downstream side satisfies the following expression (1):

$$z_p \geq -\frac{\overline{\rho C_p} \cdot d_2}{4} \cdot \frac{d_2^2 - d_1^2}{A} \cdot V_f \cdot \ln\left[\frac{(T_g - 10) - T_o}{T_s - T_o}\right] \quad (1)$$

where $T_g$ is the glass transition temperature of the coating resin [° C.];

$T_S$ is the fiber temperature at z=0 [° C.] [=$T_F(0)$];

$T_O$ is the room temperature [° C.];

$\overline{\rho C_p}$ is the average heat capacity of glass and resin [J/(cm$^3$·° C.)];

$d_1$ is the radius before coating [cm];

$d_2$ is the radius after coating [cm];

A is a given constant within the range of 1.5×10$^{-6}$ to 4.5×10$^{-6}$ [J/(sec·° C.)]; and $V_f$ is the drawing speed [cm/sec].

The above-mentioned method of drawing an optical fiber may be carried out such that, when starting the drawing of an optical fiber, forming the resin coating, the pass line length $z_p$ is made shorter regardless of the above-mentioned expression (1) upon leading and is changed to a length satisfying the above-mentioned expression (1) upon production.

BRIEF DESCRIPTION OF THE DRAWINGS

FIGS. 4A and 4B are tables, each showing the relationship among the pass line length $z_p$, drawing speed $V_f$, temperature at the entrance part of capstan, and states of deformation (collapse) of resin coating, for the respective cases where the glass transition temperature $T_g$, $T_g$ is 80° C. with (a) and $T_g$ is 105° C. with (b)

DESCRIPTION OF THE PREFERRED EMBODIMENTS

Figure 1:
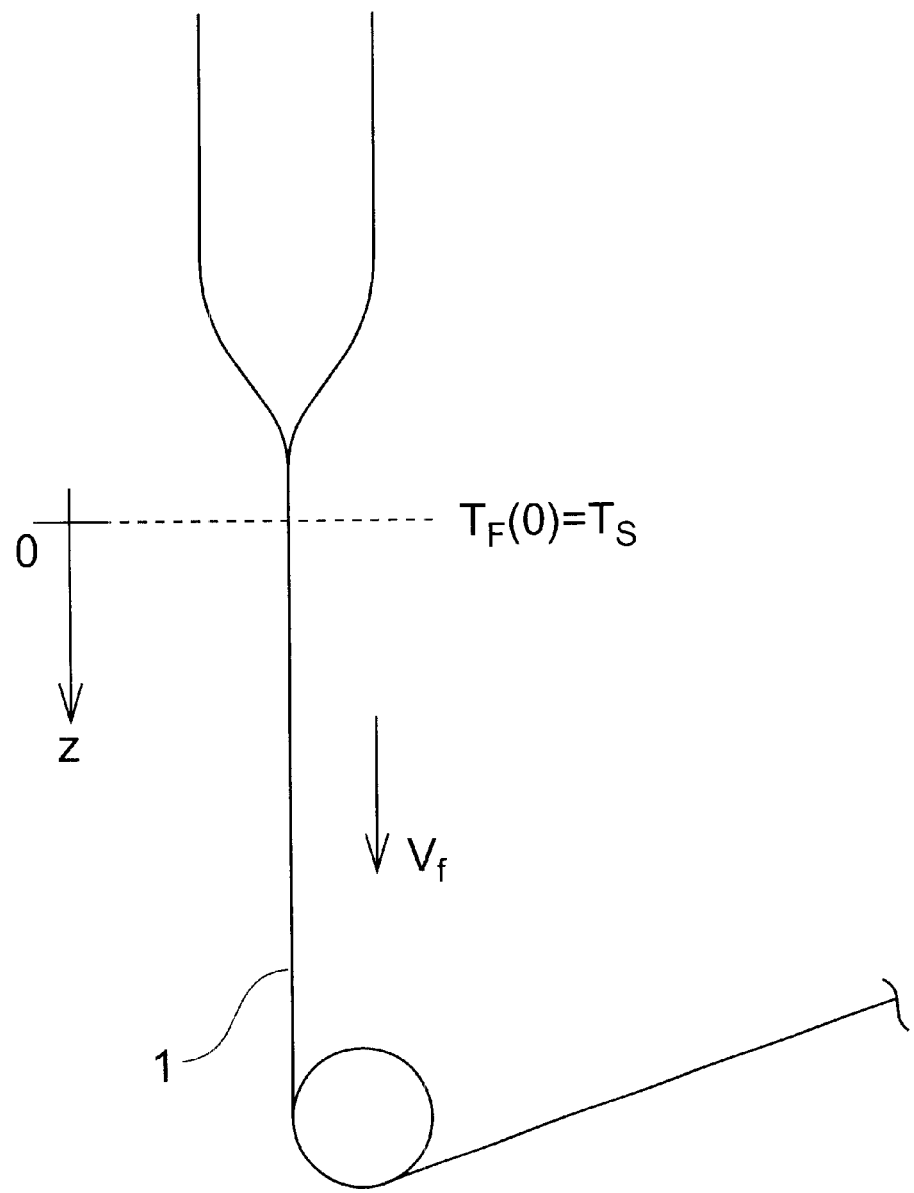
FIG. 1 is a side view showing a state of an optical fiber upon drawing.

An embodiment of the method of drawing an optical fiber in accordance with the present invention will be explained with reference to the drawings.

First, the above-mentioned expression (1), on which the present invention is based, will be explained.

Various studies have been performed concerning the temperature of optical fiber at the time of drawing thereof. An example of papers describing such a study is U. C. Peak and C. R. Kurkjian, "Calculation of Cooling Rate and Induced Stresses in Drawing of Optical Fibers," Journal of American Ceramic Society, Vol. 58, No. 7–8, pp. 330–331. It discloses an expression for calculating the temperature of a bare optical fiber (an optical fiber free of resin coatings) upon drawing from various kinds of parameters at the time of drawing. This expression is represented as the following expression (2):

$$T_F(z) = T_o + (T_s - T_o)\exp\left(-\frac{4h}{\rho \cdot C_p \cdot D} \cdot \frac{z}{V_t}\right) \quad (2)$$

where $T_F(z)$ is the fiber temperature at the position z [° C.];
$T_S$ is the fiber temperature at z=0 [° C.] [=$T_F(0)$];
$T_O$ is the room temperature [° C.];
$\rho$ is the density [g/cm³];
$C_p$ is the specific heat [J/(g·° C.)];
D is the glass fiber diameter [cm];
h is the heat transfer coefficient [J/(cm²·sec·° C.) and
$V_f$ is the drawing speed [cm/sec].

This expression (2) forms the z-coordinate axis from a given point on an optical fiber 1, which is being drawn at the drawing speed $V_f$, on the drawing pass of optical fiber 1 as shown in FIG. 1, and represents the temperature $T_F(z)$ of optical fiber 1 at the coordinate z as a function of z (where $T_F(0)=T_s$). The heat transfer coefficient h indicates the speed at which heat is taken away from a surface of a material (solid/liquid), and its unit in expression (2) is [J/(cm²·sec·°] C.)]. While [J/(g·K)] is often used as the unit for specific heat $C_p$, the unit [J/(g·° C.)] in expression (2) is equivalent thereto.

Figure 2:
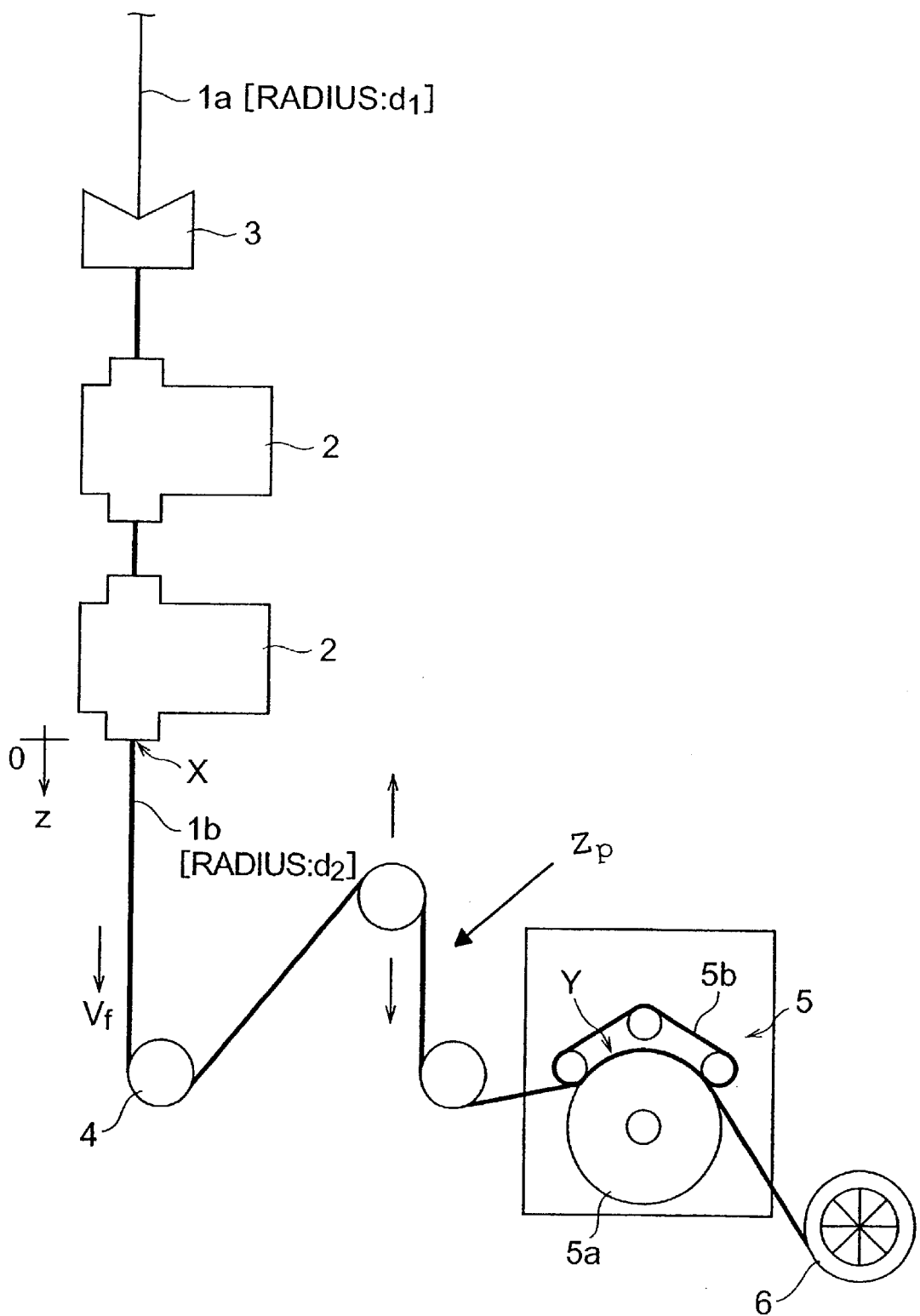
FIG. 2 is a side view showing a drawing apparatus for carrying out the method of making an optical fiber in accordance with the present invention.

Though the above-mentioned expression (2) is an expression concerning a bare optical fiber without resin coatings, the periphery of bare optical fiber is provided with a resin coating at the time of drawing the optical fiber in practice. Therefore, the optical fiber formed with a resin coating will now be studied. For forming the optical fiber with a resin coating, as shown in FIG. 2, the periphery of optical fiber 1a is coated with a resin by use of a coating die 3, and thus coated resin cures in curing furnaces 2. In the curing furnaces 2, the coated resin cures through a chemical reaction. The most common method is one in which a UV-curable resin is used for the resin coating, and the resin cures by UV irradiation within the curing furnaces 2.

Since the heat capacity (density×specific heat) of glass and that of the resin of resin coating are substantially identical to each other, the optical fiber subjected to the resin coating, as a whole, can be approximated as a thermally homogeneous line material. Specifically, glass at the time of drawing has a density of $\rho$2.2 [g/cm³] and a specific heat of $C_p$=1.047 [J/(g·° C.)], so that the heat capacity $\rho \cdot C_p$=2.3 [J/cm³·° C.]. The resin at the time of drawing, on the other hand, has a density of $\rho$=1.07 to 1.1 [g/cm³] and a specific heat of $C_p$=2.095 [J/(g·° C.)], so that the heat capacity $\rho \cdot C_p$=2.2 to 2.3 [J/cm³·° C.], whereby the resin can be considered substantially equivalent to glass in terms of heat.

However, even when the resin-coated optical fiber 1b can be regarded as a thermally homogeneous line material, heat of reaction occurs in the curing process of the above-mentioned resin, whereby the actual temperature of the resin-coated optical fiber 1b deviates from the above-mentioned expression (2). Namely, the above-mentioned expression (2) cannot directly apply to the resin-coated optical fiber 1b. A curing reaction continues in the optical fiber 1b after it exits from the curing furnace 2 (referred to as post-curing), thereby yielding reaction heat thereafter. As the amount of resin (coating diameter) increases, the amount of reaction heat occurring per unit length increases, which further accelerates the reaction, thereby generating heat. Namely, as the amount of resin to cure increases, the resin-coated optical fiber 1b becomes less likely to be cooled.

Therefore, the inventors have carried out diligent studies in order to express the temperature $T_F(Z)$ of the resin-coated optical fiber 1b at the coordinate z as a function of z based on the above-mentioned expression (2). As a result, the inventors have found that the temperature $T_F(z)$ of resin-coated optical fiber at the coordinate z can also be expressed as a function of z by the following expression (3). Here, the following expression (3) favorably holds at least when $150 \leq d_2 \leq 300$ μm and $50 \leq V_f \leq 600$ m/min.

$$T(z) = T_o + (T_s - T_o)\exp\left(-\frac{4h}{\overline{\rho C_p} \cdot 2d_2} \cdot \frac{2A}{d_2^2 - d_1^2} \cdot \frac{z}{V_f}\right) \quad (3)$$

where $T_F(z)$ is the fiber temperature at the position z [° C.];
$T_S$ is the fiber temperature [=$T_F(0)$] at z=0 [° C.];
$T_O$ is the room temperature [° C.];
$\overline{\rho C_p}$ is the average heat capacity of glass and resin [J/(cm³·° C.)];
$d_1$ is the radius before coating [cm];
$d_2$ is the radius after coating [cm];
A is a given constant within the range of $1.5 \times 10^{-6}$ to $4.5 \times 10^{-6}$ [J/(sec·° C.)]; and
$V_f$ is the drawing speed [cm/sec].

The average heat capacity avr($\rho C_p$) (also expressed as such) of glass and resin in the above-mentioned expression (3) is obtained as being weighted with the volume ratio (i.e., cross-sectional area ratio) between the glass part and coating resin. By way of example, the case of an optical fiber comprising a glass part, a primary coating, and a secondary coating will be explained. Let $d_g$ be the radius of glass part, $d_1$ be the radius of primary coating, and $d_2$ be the radius of secondary coating. Also, let $\rho_g$ be the density of glass part, $\rho_1$ be the density of primary coating, and $\rho_2$ be the density of secondary coating. Further, let $C_{pg}$ be the specific heat of glass part, $C_{p1}$ be the specific heat of primary coating, and $C_{p2}$ be the specific heat of secondary coating.

The glass part has a cross-sectional area of $\pi d_g^2$, the primary coating has a cross-sectional area of $(\pi d_1^2 - \pi d_g^2)$ the secondary coating has a cross-sectional area of ($\pi d_2^2 - \pi d_1^2$), and the optical fiber as a whole has a cross-sectional area of $\pi d_2^2$. The respective heat capacities (density×specific heat) of individual parts are averaged according to their cross-sectional areas as follows:

$$avr(\rho C_p) = (\pi d_g^2 / \pi d_2^2) \cdot \rho_g \cdot C_{pg} +$$
$$[(\pi d_1^2 - \pi d_g^2)/\pi d_2^2]\rho_1 \cdot C_{p1} + [(\pi d_2^2 - \pi d_1^2)/\pi d_2^2]$$
$$\rho_2 \cdot C_{p2} = (d_g^2/d_1^2)\rho_g \cdot C_{pg} + [(d_1^2 - d_2^2)/d_2^2]\rho_1 \cdot$$
$$C_{p1} + [(d_2^2 - d_1^2)/d_2^2]\rho_2 \cdot C_{p2}$$

From this expression, $avr(\rho C_p)$ is computed. While the case of an optical fiber comprising a glass part, a primary coating, and a secondary coating is explained here, $avr(\rho C_p)$ is computed by a similar method in other cases such as an optical fiber comprising a glass part and a single layer of resin coating.

The constant A in the above-mentioned expression (3) is set to a given value within the range of $1.5 \times 10^{-6}$ to $4.5 \times 10^{-6}$ [J/(sec·° C.)]. As mentioned above, the above-mentioned expression (2) cannot correctly express the temperature at the coordinate z in the optical fiber 1b having a resin coating. Therefore, the above-mentioned expression (3) uses the value $2A/(d_2^2 - d_1^2)$ as one corresponding to the heat transfer coefficient h in expression (2), thereby expressing the temperature $T_F(z)$ of the optical fiber 1b having a resin coating at the coordinate z as a function of z. Namely, the part corresponding to the heat transfer coefficient h in expression (2) depends on the thickness of resin coating.

The constant A takes different values within the above-mentioned range depending on whether natural cooling or forcible cooling with helium is employed, and so forth. For example, the value of constant A in the case of forcible cooling with helium is two to three times that in the case of natural cooling. Explained here is the case where an optical fiber yielding a diameter $2d_2$ of 300 to 600 μm after being coated with a resin is drawn at a drawing speed of $V_f$=50 m/min or higher [where the unit for $d_2$ is [cm], and the unit for $V_f$ is [cm/sec] in expression (2)]. Normally, optical fibers are cooled with a gas. In practice, the gas having the highest thermal conductivity is helium, whereas the gas having the lowest one is air. Here, the constant A is $1.5 \times 10^{-6}$ when cooled with air, and is $4.5 \times 10^{-6}$ when cooled with helium gas.

As explained above, the glass and resin can be treated as a thermally homogeneous material in terms of heat capacity, whereby the above-mentioned expression (3) taking account of the reaction heat is applicable not only to the case where a single layer of resin coating is formed around the glass part, but also to the case where a secondary coating is formed around an optical fiber provided with a primary coating. While $d_1$ and $d_2$ are the radius of glass and that after coating, respectively, in the former case; they are the radius after primary coating and that after secondary coating, respectively, in the latter case.

The inventors conducted an experiment for verifying expression (3) in the case where a secondary coating is formed around an optical fiber provided with a primary coating. The experiment was performed by a drawing apparatus for carrying out an embodiment of the drawing method of the present invention. This drawing apparatus is the one shown in FIG. 2 mentioned above. In the apparatus shown in FIG. 2, the optical fiber 1a provided with the primary coating is passed through the coating die 3, whereby its periphery is coated with a resin for the secondary coating.

Here, UV-curable resins are used as resins for primary coating and secondary coating. In terms of heat, the resin for primary coating and the resin for secondary coating can be treated in the same manner like a single layer of coating.

The optical fiber having its periphery coated with a UV-curable resin is passed through a pair of curing furnaces 2. Within the curing furnaces 2, UV lamps, the UV rays are irradiated to the UV-curable resins, so as to cure. The optical fiber coming out of the furnaces 2 changes its direction due to a guide roller 4 and then is pulled by a capstan 5. The guide roller 4 does not hold the optical fiber 1b from the sides with a pressure, and thus has no such influence on the optical fiber 1b as to deform the resin coating. The capstan 5 is constituted by a capstan wheel 5a and a capstan belt 5b.

The optical fiber 1 is held between the capstan wheel 5a and the capstan belt 5b pressed against the capstan wheel 5a, and is pulled as the capstan wheel 5a or capstan belt 5b is driven. The optical fiber 1b pulled by the capstan 5 is taken up by a take-up bobbin 6. Here, the z-coordinate axis is taken on the drawing pass of optical fiber 1b, and the most downstream outlet X of curing furnaces 2 is set to the origin (z=0) of coordinate z.

Figure 3:
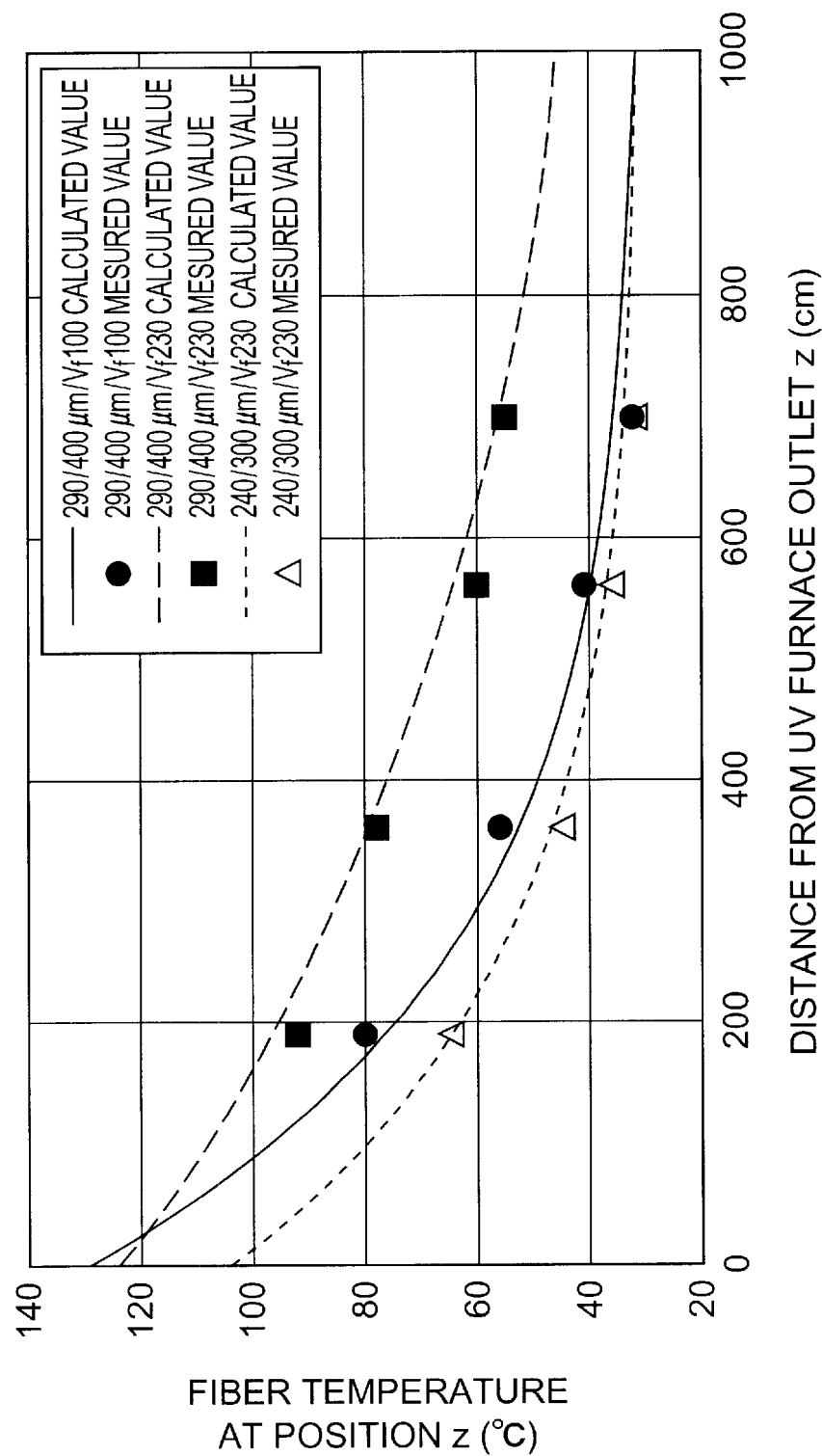
FIG. 3 is a graph showing the relationship between the distance z from the outlet of a UV lamp and the fiber temperature at that position.

The results of experiment are shown in the graph of FIG. 3. Here, $T_O$=25[° C.], $avr(\rho C_p)$=2.3 [J/cm$^3$·° C.], and A=$1.5 \times 10^{-6}$ [J/(sec·° C.)]. In the legends on the graph, 290/400 μm/$V_f$100 indicates that the diameter $2d_1$ of primary coating is 290 μm, the diameter $2d_2$ of primary coating is 400 μm, and the drawing speed $V_f$ is 100 m/min [where the unit for $d_1$ and $d_2$ is [cm], and the unit for $V_f$ is [cm/sec] in expression (3)]. As for $T_S$ used when computing the calculated values by expression (3), the actual temperature of optical fiber when measuring the corresponding measured value is employed. Namely, $T_S$=130[° C.] in the case of 290/400 μm/$V_f$100, $T_S$=124[° C.] in the case of 290/400 μm/$V_f$230, and $T_S$=105[° C.] in the case of 290/300 μm/$V_f$100. For the measurement of $T_S$, a noncontact type fiber thermometer (manufactured by LUXTRON Corporation) was used. As can be seen from the graph of FIG. 3, the calculated values based on the above-mentioned expression (3) and actually measured values substantially match each other, whereby it has experimentally been verified that the above-mentioned expression (3) can represent the temperature $T_F(z)$ of the resin-coated optical fiber 1b at the coordinate z.

If the above-mentioned expression (3) is solved for z, then the following expression (4) will be obtained:

$$z = -\frac{\overline{\rho C_p} \cdot d_2}{4} \cdot \frac{d_2^2 - d_1^2}{A} \cdot V_f \cdot \ln\left[\frac{T(z) - T_o}{T_s - T_o}\right] \quad (4)$$

As explained in the foregoing, the above-mentioned expression (3) represents the temperature $T_F(z)$ of the optical fiber 1b formed with a resin coating at the coordinate z as a function of z. Here, a condition under which the resin coating is cooled and cures to such an extent that it is not deformed when held with the capstan 5 will be studied. As for this condition, it has experimentally been known that, letting $T_g$ be the glass transition temperature of the coated resin (the resin of secondary coating here), no deformation occurs in the resin coating if the temperature of optical fiber held from the sides by the capstan 5 is lower than $(T_g - 10)$ [° C.]. Here, the glass transition temperature is a temperature at which the ratio of change in Young's modulus is maximized with respect to temperature.

Namely, letting the pass line length $z_p$ be the length from the most downstream outlet X of curing furnaces 2 to the most upstream entrance part Y of capstan, $(T_g - 10)$ is inputted to $T_F(z)$ in the above-mentioned expression (4), and the range is fixed, whereby the following expression (1) is obtained. If the pass line length $z_p$ is set to the length indicated by the following expression (1), then the resin coating can be prevented from deforming.

$$z_p \geq -\frac{\overline{\rho C_p} \cdot d_2}{4} \cdot \frac{d_2^2 - d_1^2}{A} \cdot V_f \cdot \ln\left[\frac{(T_g - 10) - T_o}{T_s - T_o}\right] \quad (1)$$

where $T_g$ is the glass transition temperature of the coating resin [° C.];

$T_S$ is the fiber temperature at z=0 [° C.] [=$T_F(0)$];

$T_O$ is the room temperature [° C.];

$\overline{\rho C_p}$ is the average heat capacity of glass and resin [J/(cm$^3$·° C.)];

$d_1$ is the radius before coating [cm];

$d_2$ is the radius after coating [cm];

A is a given constant within the range of $1.5 \times 10^{-6}$ to $4.5 \times 10^{-6}$ [J/(sec·° C.)]; and $V_f$ is the drawing speed [cm/sec].

The inventors carried out an experiment for verifying the above-mentioned expression (1) in the case where a secondary coating was formed around the optical fiber $1a$ provided with a primary coating. UV-curable resins were used as the resin coatings, UV lamps were used as the curing furnaces 2, and the most downstream outlet X of UV lamps was taken as the origin (z=0) of coordinate z here as well. Also, avr($\rho C_p$)=2.3 [J/cm$^3$·° C.], and A=1.5×10$^{-6}$ [J/(sec·° C.)]. If these values are inputted in expression (1), then the following expression (5) is obtained:

$$z_p \geq -3.8 \times 10^5 \times d_2(d_2^2 - d_1^2) V_f \cdot \ln\left[\frac{(T_g - 10) - T_o}{T_s - T_o}\right] \quad (5)$$

Using this expression (5), the inventors carried out an experiment for verifying expression (1). Tables of FIGS. 4A and 4B show the results of experiment. FIG. 4A indicates the case where $T_g$=80[° C.], i.e., the case where no deformation such as collapse is expected to occur in the resin coating if the temperature of optical fiber at the entrance part of capstan is ($T_g$-10)=70[° C]. On the other hand, FIG. 4B indicates the case where $T_g$=105[° C.], i.e., the case where no deformation such as collapse is expected to occur in the resin coating if the temperature of optical fiber at the entrance part of capstan is ($T_g$-10)=95[° C.].

Also, $T_O$=25[° C.]). As for $T_S$ used for calculation, the actually measured temperature of optical fiber was employed (see the values in Tables). As can be seen from the tables of FIGS. 4A and 4B, the resin coating is securely kept from deforming in the case where the above-mentioned expression (1) [i.e., expression (5)] holds true [where the unit for $d_1$ and $d_2$ is [cm], and the unit for $V_f$ is [cm/sec] in expressions (1) and (5)]. In the case where the above-mentioned expression (1) [i.e., expression (5)] does not hold, by contrast, the resin coating is mostly deformed. Namely, it has experimentally been verified that the above-mentioned expression (1) can represent the range of pass line length $z_p$ within which the resin coating is not deformed.

Figure 5:
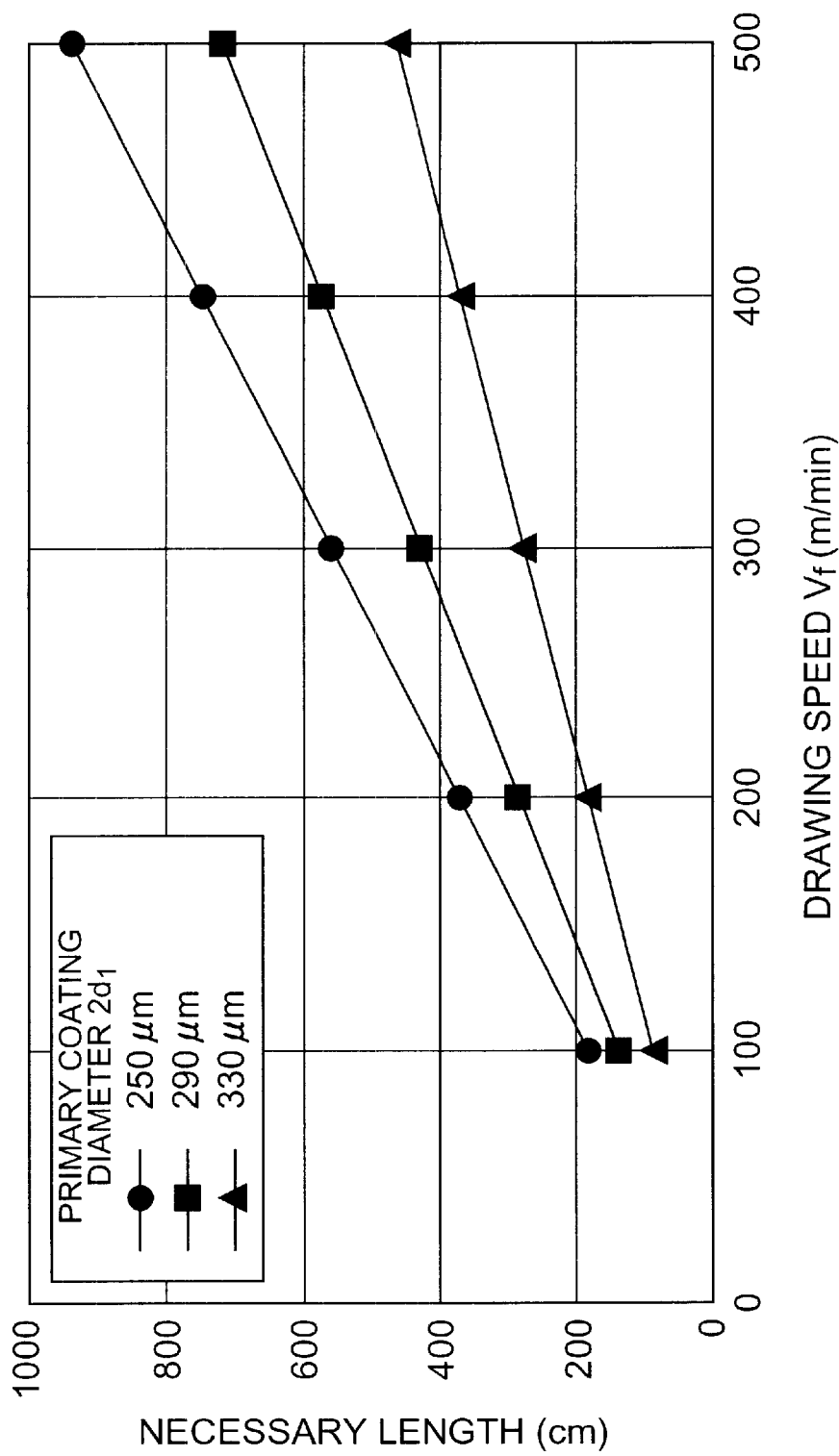
FIG. 5 is a graph showing the relationship between the drawing speed $V_f$ and the minimum pass line length necessary for preventing the coating resin from deforming (necessary length).

Also, the minimum pass line length (necessary length) needed for keeping the resin coating from deforming was computed in the cases where, while the diameter 2$d_2$ of secondary coating was fixed at 400 $\mu$m, the diameter 2$d_1$ of primary coating was set to 250 $\mu$m, 290 $\mu$m, and 330 $\mu$m, respectively. FIG. 5 shows the results of computation. In the cases shown in FIG. 5, avr($\rho C_p$)=2.3 [J/cm$^3$·° C.], A=1.5×10$^{-6}$ [J/(sec·° C.)], $T_g$=80[° C.], $T_S$=125[° C.], and $T_O$=25[° C.].

In the apparatus shown in FIG. 2, the guide roller 4 is movable, so as to make the pass line length $z_p$ variable. As a consequence, when the drawing of optical fiber is started, the pass line length $z_p$ is shortened at the time of leading during which the end part of optical fiber is successively attached to the guide roller 4, capstan 5, and take-up bobbin 6, so as to improve the operation efficiency in the starting operation for drawing. At the time of production when the optical fiber is actually produced after the completion of starting operation for drawing, the pass line length $z_p$ is changed so as to satisfy the above-mentioned expression (1), whereby an optical fiber having a favorable quality can be produced with a favorable efficiency in manufacture.

The present invention is not restricted to the above-mentioned embodiment. For example, though the above-mentioned embodiment relates to a case where the secondary coating is provided on the primary coating, the present invention is also applicable to cases where a bare optical fiber is provided with a single layer of resin coating, where the primary coating and secondary coating are effected at the same time, and so forth. Also, for changing the pass line length $z_p$, the capstan 5 may be moved without moving the guide roller 4.

According to the present invention, the pass line length $z_p$ is secured so as to satisfy the above-mentioned expression (1) when the optical fiber yielding an outside diameter of 300 to 600 $\mu$m after a resin coating is formed is drawn at a drawing speed of at least 50 m/min, whereby the resin coating can securely be cooled and cure at the entrance part of capstan, so as to be prevented from deforming. As a consequence, the efficiency in manufacture of optical fiber can be improved while the quality of optical fiber is kept high, whereby both the quality of optical fiber and improvement of efficiency in manufacture can be achieved at a high level.

Further, when starting the drawing of optical fiber, the pass line length $z_p$ can be shortened at the time of starting operation for drawing during which the end part of optical fiber is successively attached to a capstan and the like, whereby the operation efficiency of leading operation can be improved in accordance with the present invention. Also, at the time of production when the optical fiber is actually produced after the completion of leading operation, the pass line length $z_p$ is changed so as to satisfy the above-mentioned expression (1), whereby an optical fiber having a favorable quality can be produced with a favorable efficiency in manufacture.

What is claimed is:

1. A method of drawing an optical fiber, comprising:

drawing an optical fiber at a drawing speed of at least 50 m/min;

coating said optical fiber with a UV-curing resin to yield a coated optical fiber having an outside diameter between about 300 to 600 $\mu$m;

curing said UV-curing resin using at least one UV-curing furnace; and drawing said coated optical fiber downstream to a capstan configured to pull said coated optical fiber and then to a take up bobbin, and cooling said coated optical fiber to prevent deformation of said resin by ensuring that a pass line length $z_p$ between the most downstream outlet of said at least one UV-curing furnace to the most upstream entrance part of said capstan satisfies the following expression (1):

$$z_p \geq -\frac{\overline{\rho C_p} \cdot d_2}{4} \cdot \frac{d_2^2 - d_1^2}{A} \cdot V_f \cdot \ln\left[\frac{(T_g - 10) - T_o}{T_s - T_o}\right]$$

where $T_g$ is the glass transition temperature of the coating resin [° C.];

$T_S$ is the fiber temperature [=$T_F(0)$] at z=0 [° C.];

$T_O$ is the room temperature [° C];

$\overline{\rho C_p}$ is the average heat capacity of glass and resin [J/(cm$^3$·° C.)];

$d_1$ is the radius before coating [cm];

$d_2$ is the radius after coating [cm];

A is a given constant within the range of $1.5\times10^{-6}$ to $4.5\times10^{-6}$ [J/(sec·° C.]; and $V_f$ is the drawing speed [cm/sec], and wherein said UV-curable resin has a glass transition temperature between about 80° C.–105° C.

2. The method of drawing an optical fiber according to claim 1, wherein said pass line length $z_p$ is made shorter than minimum length defined by said expression (1) upon starting operation and is changed to a length satisfying said expression (1) upon production.

* * * * *